March 14, 1967 S. H. YUNGUL 3,309,607
METHOD FOR THE DETERMINATION OF DIRECTION OF EFFECTIVE
STRIKE AND DIP FROM TELLURIC POTENTIALS UTILIZING
A T-SPREAD QUADRUPLE ELECTRODE ARRAY
Filed Dec. 22, 1964  2 Sheets-Sheet 1

INVENTOR
SULHI H. YUNGUL
BY
ATTORNEYS

March 14, 1967  S. H. YUNGUL  3,309,607
METHOD FOR THE DETERMINATION OF DIRECTION OF EFFECTIVE
STRIKE AND DIP FROM TELLURIC POTENTIALS UTILIZING
A T-SPREAD QUADRUPLE ELECTRODE ARRAY
Filed Dec. 22, 1964  2 Sheets-Sheet 2

INVENTOR
SULHI H. YUNGUL
BY
ATTORNEYS

United States Patent Office

3,309,607
Patented Mar. 14, 1967

3,309,607
METHOD FOR THE DETERMINATION OF DIRECTION OF EFFECTIVE STRIKE AND DIP FROM TELLURIC POTENTIALS UTILIZING A T-SPREAD QUADRUPOLE ELECTRODE ARRAY
Sulhi H. Yungul, La Habra, Calif., assignor to Chevron Research Company, a corporation of Delaware
Filed Dec. 22, 1964, Ser. No. 420,340
6 Claims. (Cl. 324—1)

This invention relates to geophysical prospecting, and more particularly to a method of geophysical prospecting using natural telluric currents. Still more particularly this invention relates to the determination of the effective principal axes of electrical conductivity anisotropy and the direction of the effective dip by a more convenient and more precise new field method than the previous prior art methods.

The definitions of "strike" and "dip," and the "principal axes of conductivity anisotropy" are well known in the geophysical literature. However, the definitions with the qualifying word "effective," as they are intended here, pertain only to the art of telluric prospecting; they signify the gross properties of the subsurface, in terms of its combined microscopic and macroscopic properties, and in terms of the depth of penetration of the telluric currents, and will be clarified in the body of this specification.

The effective strike and the effective dip can be determined by the methods described in U.S. Patent 2,586,667 issued February 19, 1952 to G. Kunetz, and U.S. Patent 2,623,097, issued December 23, 1952 to the same inventor. Those patents taught the meaning of the relative ellipse area, and its determination at various points over a geographical region.

To review briefly the meaning of the relative ellipse area: There are natural telluric currents flowing in the earth that behave as if they were caused by large scale electromotive forces acting over large geographical areas. These large scale electromotive forces vary in magnitude and direction, and they cause corresponding earth currents that vary in magnitude and direction. The induced currents tend to be uniform over geographical regions measured in terms of tens or even hundreds of miles, but local variations in subsurface conductivities cause the induced currents to assume local variations and these local variations can be indicated by electrical potential (or voltage) measurements between electrodes buried in the earth. If voltage measurements are made between pairs of electrodes not all in a straight line, directional components of the earth voltages can be measured and from the measured directional components the "telluric field vector" can be deduced.

In general it is found that if the magnitude of the telluric field vector at one location is normalized by dividing it by the simultaneous magnitude of the telluric field vector at a second location, the vector at the first location, as it rotates will approximately describe an ellipse. In telluric prospecting it has turned out to be convenient to have the concept of the "relative ellipse area," which is the ratio between the area swept by the telluric field vector at the location under consideration and the area swept simultaneously by the telluric field vector at a reference location.

It is well known, in the art of telluric prospecting, that the direction, at one point at the surface of the earth, in which the relative ellipse area has no space variation is the direction of the "effective strike" of the subsurface formations, that this direction is one of the "principal axes of effective electrical conductivity anisotropy" of the subsurface formations, that the direction of the 'effective dip" is coincident with the other "principal axis of effective electrical conductivity anisotropy" orthogonal to the aforementioned axis, and that the sense of the dip is that in which the telluric relative ellipse area decreases. It is obvious that one can determine the ellipse area values at least at three closely spaced points, obtain the space variations of the ellipse area, and hence the effective strike and the effective dip. This procedure necessitates simultaneous measurements at two stations, a "base station" and a "field station." It necessitates also two crews in the field, and the repetition of the measurements at three field stations at least, and also time consuming office analysis.

The object of the present invention is a simplified field method for determining "effective strike" and "effective dip" by means of one set of measurements of the natural telluric field vector at one location at the surface of the earth employing a T-spread quadrupole electrode array.

Another object of the present invention in accordance with the preceding object is to provide an analysis procedure for determining effective strike and effective dip from the measurements of the natural telluric field vector that is simpler, faster, and more adaptable to routine than the procedure used in prior art methods.

Further objects and features of the invention will be readily apparent to those skilled in the art from the specifications and appended drawings illustrating a preferred embodiment wherein.

Figure 1:
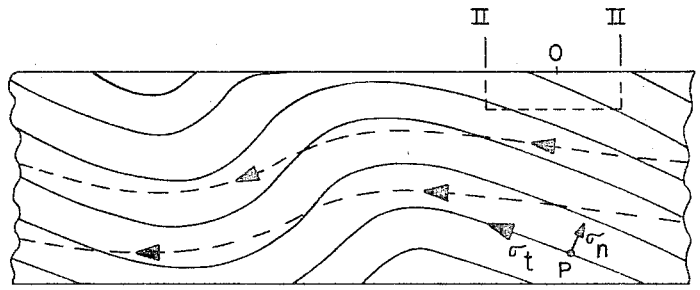
FIGURE 1 is a cross-sectional illustration through an electrical-conductivity-wise-homogeneous, but anisotropic, subsurface portion of an earth formation.
Figure 2:
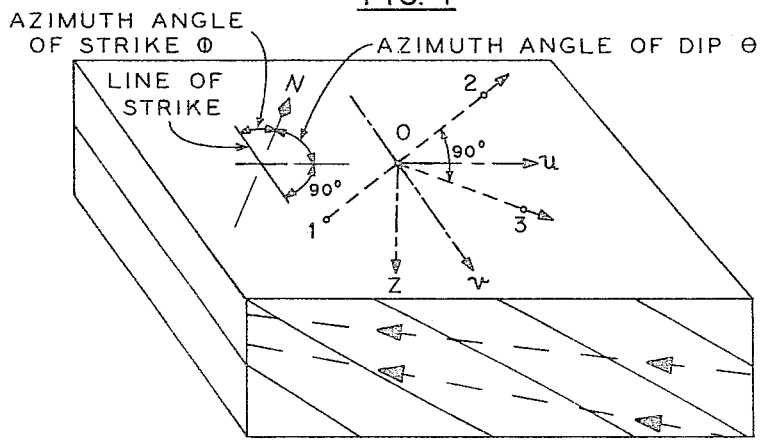
FIGURE 2 is a perspective illustration of an enlarged portion of FIGURE 1 centered at O and including that portion enclosed by the dotted lines II—II.

FIGURES 1 and 2 illustrate an effectively two-dimensional, homogeneous but anisotropic subsurface. In the orthogonal coordinate system $u$, $v$, $z$, the $u$-$v$ plane represents the surface of the earth, and the $z$-axis is downward. The solid-line curves represent the "surfaces of anisotropy" which are parallel to each other and to the $v$-axis. At any point P in the subsurface the conductivity in the direction which is perpendicular to the surface of anisotropy at that point is $\sigma_n$, and the conductivity in the direction which is tangential to this surface is $\sigma_t$. The magnitudes of $\sigma_n$ and $\sigma_t$ are independent of the space coordinates of point P, and $\sigma_n < \sigma_t$.

If the subsurface shown in FIGURE 1 were horizontally homogeneous and isotropic, a large-scale telluric electric field would produce in that subsurface a uniform current parallel to the electric field and parallel also to the surface of the earth. But because that subsurface is anisotropic as shown, the telluric currents will not in general be parallel either to the large-scale telluric electric field, or to surface of the earth. If the large-scale field were to assume a constant intensity but various azimuths the earth currents that give rise to the measurable telluric voltages would evidence themselves in a measured voltage vector that would trace an ellipse, of which one axis would be in the $v$-direction. The other axis would be in the $u$-direction. The telluric current lines would tend to be parallel to the surfaces of anisotropy as indicated by the dashed curves in FIGURE 1. It follows then that the $u$-axis of the telluric voltage vector ellipse would tend to decrease in the sense of the dip. On the other hand, the $v$-axis of the telluric voltage vector ellipse would tend to remain constant. Then, if one determines a direction, at a point O at the surface such that along this direction the telluric electric field intensity has no space variations, this direction is that of the strike ($v$-axis), or one of the principal axes of conductivity anisotropy along which the conductivity is equal to $\sigma_t$. The direction of the dip ($u$-axis), which is perpendicular to that of the strike, is the other principal axis of anisotropy along which the conductivity is a function of $u$. The sense of the dip is that in which the magnitude of the $u$-axis of the telluric voltage vector elipse decreases and consequently the magnitude of the relative telluric ellipse area decreases.

Figure 3:
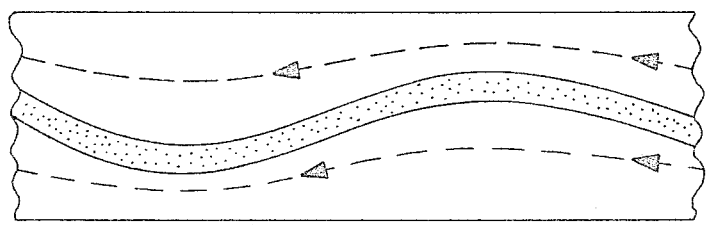
FIGURES 3 and 4 illustrate alternative subsurface conductivity distributions which would be equivalent to that of FIGURE 1 in their effective strikes and effective dips determined from telluric current measurements at the surface of the earth.
Figure 4:
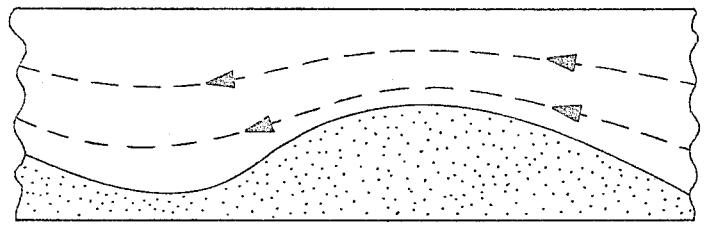

FIGURES 3 and 4 show other subsurface conductivity distributions which are equivalent to that shown in FIGURE 1, so far as the macroscopic behavior of the telluric electric field intensity measured at the surface of the earth is concerned. In FIGURES 3 and 4 the dotted areas represent geologic formations with much lower conductivities than those shown by the undotted areas, every formation being isotropic and homogeneous. In nature, the three types of effects shown in FIGURES 1, 3, and 4 are usually superimposed, and the $v$- and $u$-axis determined in the field are called "effective strike" and "effective dip," or the "effective principal axes of anisotropy."

What has been said above is applicable to subsurfaces with three-dimensional structures, because in most cases the subsurface can be considered as piece-wise two-dimensional; but actually, the effective strike, as well as the effective dip, varies from point to point at the surface.

The effective strike and the effective dip determinations themselves constitute geophysical data that can be interpreted in terms of subsurface geology. Also, some other types of geophysical exploration, such as the magnetotelluric sounding, are rendered more accurate, or less cumbersome, if the effective principal axes of anisotropy are known before proceeding with these other types of measurements.

Figure 5:
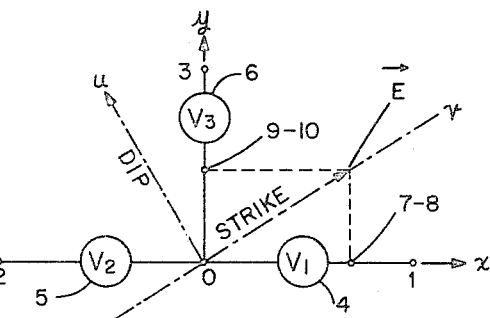
FIGURE 5 is a schematic illustration of the T-spread electrode array used in the present invention.

FIGURE 5 illustrates the plan view of a T-spread quadrupole arrangement on a portion of the earth's surface as used in the method of the present invention. The electrodes 0, 1, 2 and 3 are placed in the earth such that 0, 1 and 2 are collinear, preferably equally-spaced, and line 0–3 makes a large angle with line 2–1, preferably 90 degrees. The distances between electrodes may be measured in hundreds, or thousands of feet.

Also indicated in FIGURE 5 are three voltmeters 4, 5 and 6 connected between the electrodes 0, 1, 2, and 3. The voltmeters 4, 5, and 6 are connected to measure the voltage drops between electrodes 1 and 0, 0 and 2, and 0 and 3, respectively, these voltage drops being due to the flow of telluric currents through the resistive earth between the respective electrodes in response to telluric fields.

Figure 6:
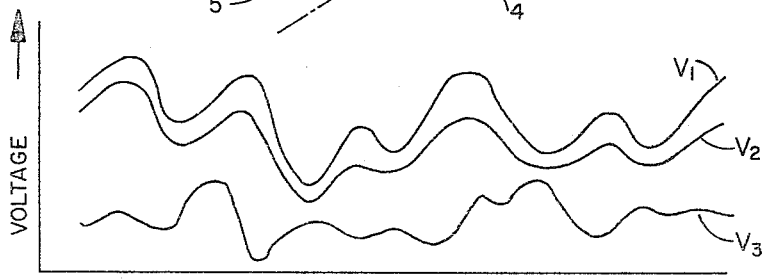
FIGURE 6 is a graphic representation of an analog record of telluric voltages measured between the electrodes of the T-spread electrode array as illustrated in FIGURE 5.

The method of the present invention includes the processing of measured voltages between the pairs of electrodes in the T-spread quadrupole array to derive certain relationships between these measured voltages. To determine these relationships, the voltage differences between electrodes 1 and 0, 0 and 2, and 0 and 3 are amplified and the three voltage drops are recorded as functions of time on an analog recorder and displayed as shown in FIGURE 6 which is known as a tellurogram. In practice, a recording at a single station (one T-spread quadrupole) is made for a time interval of 15 to 30 minutes. A record fragment like that illustrated in FIGURE 7 may represent a recording over a time interval of about one minute.

Figure 7:
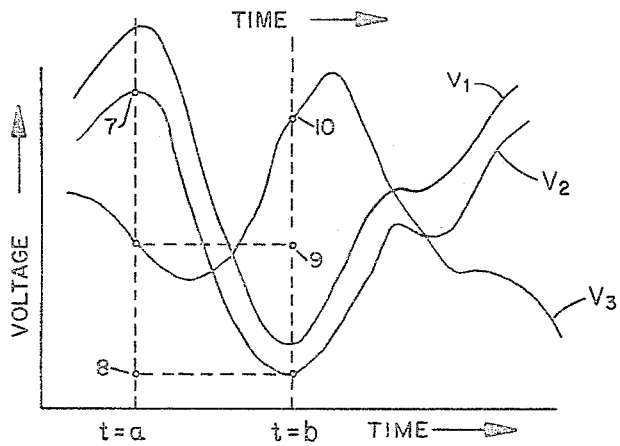
FIGURE 7 is an enlargement of a portion of an analog record of telluric voltages measured in accordance with the present invention.

Refer now to FIGURE 7, representing a portion of the record of FIGURE 6. In the present method, the voltages $V_1$, $V_2$, and $V_3$ are sampled at irregular time intervals, the intervals being preferentially selected so as to give the largest variations either in $V_1$ or $V_2$. The sampling can be done either by human means, or machine means. The manner in which the sampling is done may perhaps be best described if it is considered at first that it is done by human means, using a graph. Either in the voltage $V_1$ or in the voltage $V_2$ successive maxima and minima are marked, as shown in FIGURE 7. By detecting successive maxima and minima the largest variations in measured voltages are identified. In general, the maxima and minima in one voltage, say $V_1$, will not occur at precisely the same times as those in the other, $V_2$; however, they will usually be very close and that is all that is necessary. But it is neither desirable nor necessary that the two extrema be coincident; all that is desirable is that there is a change in $V_1$ comparable to the change in $V_2$. The times and approximate positions along the record for sampling these voltages are illustrated in FIGURE 7 as $t=a$ and $t=b$.

The first quantities that are essential in the present method are the ratios of the change $V_1$ to the change in $V_2$. Referring to FIGURE 7, one of these important quantities is $$R_{ab} = \frac{V_1(t=a) - V_1(t=b)}{V_2(t=a) - V_2(t=b)}$$

In practice, it is desirable to determine for each position of the T-spread about two dozen such values for the desired ratios.

Ratios as defined above indicate how the telluric vector behaves at the midpoint between electrodes 1 and 0 with respect to its behavior at the midpoint between electrodes 0 and 2.

Figure 8:
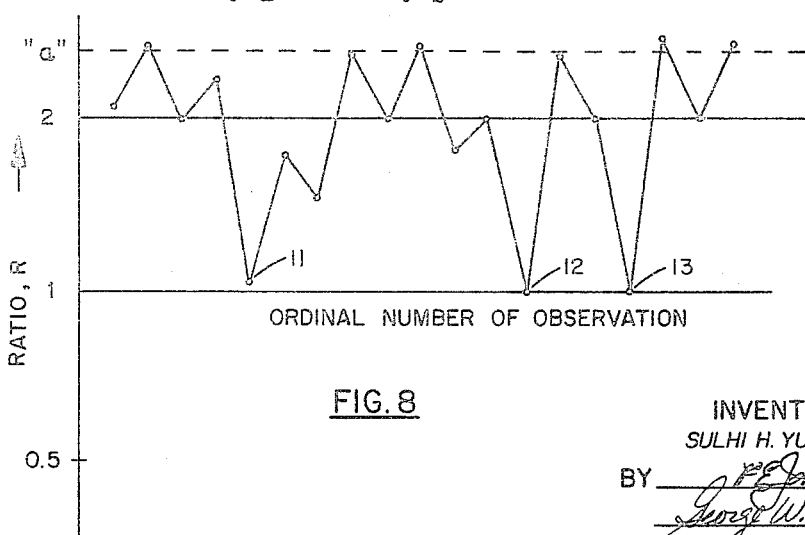
FIGURE 8 is a graphic representation of plotted ratios between observed telluric voltages produced in accordance with the method of the present invention.

For an arbitrary orientation of the line of electrodes 1, 0 and 2 with respect to the strike ($v$-axis in FIGURE 2), a graph of successive R values will usually appear like the one shown in FIGURE 8 in which the R values were plotted in logarithmic scale. As taught in the present inventor's copending application Serial No. 83,654, filed January 19, 1961, for "Telluric Current Method of Determining Ellipse Area by Simultaneously Measuring Two Voltages With a Collinear Three Electrode Array," the relative ellipse area of the midpoint between electrodes 1 and 0 with respect to the midpoint between electrodes 0 and 2 is numerically equal to the limit away from unity that the R values tend to approach. That is, the relative ellipse area is the $a$ of FIGURE 8. At points 11, 12 and 13 of FIGURE 8, the ratio is nearly unity. This implies that the directions of the variation of the electric field intensity vector corresponding to the time intervals which yielded the unity, or substantially unity, ratios at points 11, 12, and 13, were in the direction of the strike. Then, if the direction of that vector corresponding to either one of points 11, 12, and 13 is determined, this direction will be that of the strike. Let us assume that point 11 corresponds to the time interval from $t=a$ to $t=b$ as shown in FIGURE 7. The two orthogonal components of the electric field variation vector $\vec{E}$ are measured in this example by the meters recording $V_2$ and $V_3$ and are indicated in FIGURE 7 by the lengths of the straight lines between points 7 and 8 (V₂), and 9 and 10 (V₃). These components are plotted in FIGURE 5 along the proper axes, and are shown as points 7–8 and 9–10; the resultant $\vec{E}$ is in the direction of the strike. It should be noted that while point 7–8 is plotted in a direction from point 0 toward point 1 it represents a voltage measured by the voltmeter between electrodes 2 and 0. From an observation of FIGURE 7 it may be seen that the voltage $V_2$ is on a negative excursion and therefore must be plotted as a negative quantity with respect to the direction from electrode 0 to electrode 2. Hence the point 7–8 is to the right of point 0 toward point 1 rather than toward point 2. Because the change in $V_1$ is greater than the change in $V_2$ the ellipse area at the $V_1$ side relative to the $V_2$ side is known to be greater than unity. Therefore, the $V_2$ side is down the dip, and the direction of the dip, which is orthogonal to the direction of the strike, is as shown in FIGURE 5.

While certain preferred embodiments of the invention have been specifically disclosed, it should be understood that the invention is not limited thereto as many variations will be readily apparent to those skilled in the art and the invention is to be given its broadest possible interpretation within the terms of the following claims:

I claim:

1. A telluric current prospecting method for estimating the azimuth angle $\phi$ of the effective strike, by determining the principal axes of effective electrical conductivity anisotropy of the subsurface formations from measurements at the earth's surface comprising the steps of:
   (a) planting in the surface of the earth four electrodes constituting a first three electrodes positioned in a straight line and including a first end electrode, a center electrode, and a second end electrode, and a fourth electrode displaced from said center electrode in a direction perpendicular to said straight line passing through said first three electrodes, said fourth electrode being positioned at a distance from said center electrode approximately equal to the distance between said center electrode and one of said end electrodes;
   (b) simultaneously measuring and recording as continuous functions of time, three voltages constituting:
      1. a first voltage $V_1$, between said first end electrode and said center electrode,
      2. a second voltage $V_2$, between said center electrode and said second end electrode, and
      3. a third voltage $V_3$, between said center electrode and said fourth electrode;
   (c) finding at least one pair of time values, said time values being $t=a$ and $t=b$, between which time values said voltages $V_1$ and $V_2$ exhibit variations relatively large compared to their average variations between local maxima and minima, and for which the following ratio is approximately unity:

$$R_{ab} = \frac{V_1(t=a) - V_1(t=b)}{V_2(t=a) - V_2(t=b)}$$

(d) for said at least one pair of time values finding the corresponding change in said third voltage:

$$V_3(t=a) - V_3(t=b)$$

(e) and determining the azimuth angle $\phi$ of the effective strike with reference to the direction from said first end electrode toward said second end electrode, according to the relationship:

$$\phi = \tan^{-1} \frac{V_3(t=a) - V_3(t=b)}{V_2(t=a) - V_2(t=b)}$$

2. A telluric current prospecting method for estimating the azimuthal angle $\phi$ of the effective strike, by determining the principal axes of effective electrical conductivity anisotrophy of the subsurface formation from measurements at the earth's surface comprising the steps of:
   (a) measuring as a continuous function of time a first voltage between one end electrode and the center electrode of a T-spread quadrupole electrode array, simultaneously measuring as a continuous function of time a second voltage between said center electrode and another end electrode, said another end electrode being aligned with said one end and said center electrode and being spaced from said center electrode substantially the same distance as the space between said one end electrode and said center electrode,
   (b) simultaneously measuring as a continuous function of time a third voltage between said center electrode and a fourth electrode of said quadrupole array, said fourth electrode being displaced from said center electrode substantially the same distance as the space between said one end electrode and said center electrode along a line passing through said center electrode and making a substantial angle with the line of said aligned electrodes;
   (c) determining the voltage change in said first voltage during a plurality of intervals of time during the measurement of said first voltage, determining the voltage change in said second voltage during the same plurality of intervals of time during the measurement of said second voltage, correlating said determined changes in said first and second voltage during each of said intervals of time to derive a ratio between the changes in said two voltages;
   (d) selecting from said derived ratios at least one interval of time in the measurement of said first and second voltages when said measured voltages exhibit relatively large variations and when said ratio is approximately unity;
   (e) during said identified interval of time determining the change in said third voltage;
   (f) and determining the azimuth angle $\phi$ of the effective strike with respect to the direction from said one end electrode toward said another end electrode as the angle whose cotangent is the ratio of said determined voltage change in one of said first or second voltages to said voltage change in said third voltage.

3. A method for determining the azimuth angle $\phi$ of the effective strike of the subsurface formations comprising the steps of:
   (a) measuring as continuous functions of time first and second voltages representative of the telluric current between, respectively, a first pair of fixed electrodes and a second pair of fixed electrodes, said second pair of electrodes being on a straight line passing through said first pair of electrodes and including one of said first pair of electrodes;
   (b) simultaneously measuring as a continuous function of time a third voltage representative of the telluric current between a third pair of electrodes, said third pair being in a line substantially perpendicular to a line through said first pair of electrodes and including said electrode that is included in both said first and said second pair of electrodes;
   (c) comparing the voltage representations measured by said first and said second pair of electrodes to identify relatively large variations of substantially the same amount in both said first and second measured voltages produced by a telluric current flowing through said subsurface formations substantially parallel to the strike of said subsurface formations;
   (d) determining the voltage change in said measured third voltage during said identified large variations of said first and second voltages, and determining the azimuth angle $\phi$ of the effective strike by correlating the change in said first and second measured voltages during said interval of time with the change in said measured third voltage during the same interval of time.

4. A telluric current prospecting method for estimating the azimuth angle $\phi$ of the effective strike by determining the principal axes of effective electrical conductivity anisotropy of the subsurface formations from measurements at the earth's surface comprising the steps of:

(a) continuously measuring a first and a second voltage produced by telluric current flowing through the subsurface of an earth formation with an array of three equally spaced, collinear electrodes positioned at the surface of said formation, (b) recording said first and second voltages measured between the end electrodes and the center electrode of said array, (c) determining from an analysis of the change in said recorded voltages the time during said continuous measurement when said telluric current is flowing parallel to the strike of said subsurface as evidenced by substantially equal changes in both said first and second voltages, (d) simultaneously continuously measuring a third voltage represented by said telluric current with a fourth electrode and the center electrode of said array, said fourth electrode being offset perpendicularly from said array by the same distance as said equally spaced three collinear electrodes, (e) determining the change in said third voltage when said telluric current is flowing parallel to said strike, (f) and determining the azimuth angle $\phi$ of the effective strike with reference to the direction from one end electrode toward the other end electrode as the angle whose cotangent is the ratio of said determined voltage change in one of said first or second voltages to said voltage change in said third voltage.

5. A telluric current prospecting method for estimating the azimuth angle $\theta$ of the effective dip, by determining the principal axes of effective electrical conductivity anisotropy of the subsurface formations from measurements at the earth's surface comprising the steps of:

(a) planting in the surface of the earth four electrodes constituting a first three electrodes positioned in a straight line and including a first end electrode, a center electrode, and a second end electrode, and a fourth electrode displaced from said center electrode in a direction perpendicular to said straight line passing through said first three electrodes, said fourth electrode being positioned at a distance from said center electrode approximately equal to the distance between said center electrode and one of said end electrodes, (b) simultaneously measuring and recording as continuous functions of time, three voltages constituting:
1. a first voltage $V_1$, between said first end electrode and said center electrode,
2. a second voltage $V_2$, between said center electrode and said second end electrode, and
3. a third voltage $V_3$, between said center electrode and said fourth electrode, (c) finding at least one pair of time values, said time values being $t=a$ and $t=b$, between which time values said voltages $V_1$ and $V_2$ exhibit variations relatively large compared to their average recorded variations between local maxima and minima, and for which the following ratio is approximately unity:

$$R_{ab} = \frac{V_1(t=a) - V_1(t=b)}{V_2(t=a) - V_2(t=b)}$$

(d) for said at least one pair of time values $t=a$, and $t=b$, finding the corresponding change in said third voltage:
$$V_3(t=a) - V_3(t=b)$$

(e) finding at least one other pair of time values, said values being $t=c$ and $t=d$, between which said first two voltages exhibit variations relatively large compared to their average recorded variations between local maxima and minima and for which the following ratio is appreciably different from unity:

$$R_{cd} = \frac{V_1(t=c) - V_1(t=d)}{V_2(t=c) - V_2(t=d)}$$

(f) and determining the azimuth angle $\theta$ of the effective dip with reference to the direction from said first end electrode toward said second end electrode, according to the relationship:

$$\theta = (-)\tan^{-1} \frac{V_2(t=a) - V_2(t=b)}{V_3(t=a) - V_3(t=b)}$$

the angle $\theta$ having a value between plus and minus 90 degrees if $R_{cd} > 1$, and a value between 90 and 270° if $R_{cd} < 1$.

6. A telluric current prospecting method for estimating the direction of the effective dip by determining the principal axes of effective electrical conductivity anisotropy of the subsurface formations from measurements at the earth's surface comprising the steps of:

(a) measuring as a continuous function of time a first voltage between one end electrode and the center electrode of a T-spread quadrupole electrode array;

(b) simultaneously measuring as a continuous function of time a second voltage between said center electrode and another end electrode, said another end electrode being aligned with said one end and said center electrode and being spaced from said center electrode substantially the same distance as said one end electrode;

(c) simultaneously measuring as a continuous function of time a third voltage between said center electrode and a fourth electrode of said quadrupole array, said fourth electrode also being displaced from said center electrode substantially the same distance as said first electrode, the displacement being along a line passing through said center electrode and making a substantial angle with the line of said aligned electrodes;

(d) determining the voltage changes in said first voltage during a plurality of intervals of time during the measurement of said first voltage;

(e) determining the voltage changes in said second voltage during the same plurality of intervals of time during the measurement of said second voltage;

(f) correlating said determined changes in said first and second voltages during each of said intervals of time to derive ratios between the changes in said first voltage and said second voltage for said intervals of time;

(g) selecting by means of said derived ratios at least one interval of time in the measurement of said first and second voltages when said measured voltage changes are relatively large and when said ratio is approximately unity;

(h) during said identified interval of time determining the change in said third voltage;

(i) determining the direction of the effective strike as the direction of the voltage vector whose two components are the change in one of said first and second measured voltages, and the change in said third measured voltage during said at least one interval of time when said ratio is approximately unity;

(j) selecting by means of said derived ratios at least another interval of time in the measurement of said first and second voltages when said measured voltage changes are relatively large, and when said ratio between the change in said first voltage and said second voltage is appreciably different from unity;

(k) determining the direction of the effective dip as that one of the two directions perpendicular to the previously determined direction of the strike, which direction has a component in the direction from said center electrode toward said first end electrode if said ratio in said another interval of time is appreciably less than unity, and a component in the direction from said center electrode toward said second electrode if said ratio in said another interval of time is appreciably greater than unity.

References Cited by the Examiner

UNITED STATES PATENTS

| | | | |
|---|---|---|---|
| 2,240,520 | 5/1941 | Schlumberger | 324—1 |
| 2,284,990 | 6/1942 | Schlumberger | 324—1 |
| 2,586,667 | 2/1952 | Kunetz | 324—1 |
| 2,623,097 | 12/1952 | Kunetz | 324—1 |
| 2,677,801 | 5/1954 | Cagniard | 324—1 |
| 3,188,558 | 6/1965 | Yungul | 324—1 |
| 3,188,559 | 6/1965 | Yungul | 324—1 |

WALTER L. CARLSON, *Primary Examiner.*

G. R. STRECKER, *Assistant Examiner.*